US007749461B2

(12) United States Patent
Jung et al.

(10) Patent No.: US 7,749,461 B2
(45) Date of Patent: Jul. 6, 2010

(54) APPARATUS FOR CONVERTING GAS USING GLIDING PLASMA

(75) Inventors: Soonhwa Jung, Daejeon (KR); Gyeayoung Kwak, Daejeon (KR); Ju Hwa Cheong, Daejeon (KR); Wonho Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1049 days.

(21) Appl. No.: 11/472,268

(22) Filed: Jun. 22, 2006

(65) Prior Publication Data

US 2007/0120495 A1 May 31, 2007

(30) Foreign Application Priority Data

Nov. 30, 2005 (KR) ...................... 10-2005-0115908

(51) Int. Cl.
*B01J 19/08* (2006.01)

(52) U.S. Cl. ................................................. 422/186.04

(58) Field of Classification Search ............. 422/186.04
See application file for complete search history.

(56) References Cited

U.S. PATENT DOCUMENTS 4,394,162 A * 7/1983 Tylko ........................ 75/10.19
6,007,742 A * 12/1999 Czernichowski et al. .... 252/372
6,238,629 B1 5/2001 Barankova et al.

FOREIGN PATENT DOCUMENTS

KR 1020000021085 A 4/2000

* cited by examiner

*Primary Examiner*—Kishor Mayekar
(74) *Attorney, Agent, or Firm*—McKenna Long & Aldridge LLP

(57) ABSTRACT

An apparatus for converting gas using gliding plasma. The apparatus includes: a reaction chamber; an electrode member inside the reaction chamber and insulated from the reaction chamber; a power source applying electricity to the reaction chamber and the electrode member; a magnetic field generating unit installed outside the reaction chamber to rotate plasma induced inside the reaction chamber in a circumferential direction of the electrode member for forming a plasma region; and a gas supplying unit supplying material gas into the reaction chamber to allow the material gas to pass through the plasma region for converting the material gas into a different gas by energy received from the plasma. In the gas conversion apparatus, the plasma region can be widely formed in the reaction chamber to increase gas conversion rate.

8 Claims, 4 Drawing Sheets

APPARATUS FOR CONVERTING GAS USING GLIDING PLASMA

CROSS-REFERENCE TO RELATED PATENT APPLICATION

This application claims the benefit of Korean Patent Application No. 10-2005-0115908, filed on Nov. 30, 2005, in the Korean Intellectual Property Office, the disclosure of which is incorporated herein in its entirety by reference.

BACKGROUND OF THE INVENTION

1. Field of the Invention

The present invention relates to an apparatus for converting gas using gliding plasma, and more particularly, to an apparatus for converting material gas into desired gas by swirling gliding plasma arc.

2. Description of the Related Art

Various gas conversion apparatuses use plasma to change the molecular structure of gas (material gas) for converting the material gas into a different type of gas (post-reaction gas). Most of the gas conversion apparatuses have a similar structure and operate in a similar manner. That is, most of the gas conversion apparatuses have a mechanism for generating plasma in a closed reaction chamber and injecting material gas into the plasma to collide the molecules of the material gas with the electrons of the plasma for separating molecules of the material gas.

For example, methane, a main component of natural gas, can be converted into acetylene using the gas conversion apparatus. That is, acetylene can be produced from natural gas. As is well-known, the acetylene is a chemical intermediate that can be used in various fields as a starting material for various polymers such as a chlorinated vinyl monomer required for synthetic rubber, acetic acid, vinyl, or PVC.

The acetylene can be produced from the natural gas (specifically, methane) by a high temperature method (thermal treating method) or a low temperature method (non-thermal treating method).

Representative examples of the thermal treating method are an electric arc method and a partial oxidation method.

In the electric arc method, the natural gas is heated to a high temperature using the thermal energy of hot plasma to induce thermo-chemical reaction for obtaining acetylene from the natural gas. German Huel Company's commercial process can be taken as an example of the electric arc method.

In the partial oxidation method, 75% of reaction gas (methane) is burned to generate thermal energy, and then the thermal energy is applied to the remaining 25% of the methane to obtain acetylene by thermo-chemical reaction. BASF Company's partial oxidation combustion process can be taken as a representative example.

However, in producing the acetylene using the thermal treating method, the thermo-chemical reaction is performed at a temperature higher than above 3000K, and worse the thermo-chemical reaction further progresses after the acetylene is already produced to yield carbon and hydrogen from the acetylene. Therefore, the produced acetylene gas must be rapidly quenched to stop the reaction. However, as is well-known, it is difficult to rapidly quench the acetylene gas since gas has a low thermal capacity.

As described above, since the thermal treating method includes an extremely hot reaction process, it is difficult to select suitable materials for a reaction chamber and stop the decomposition reaction. Further, the conversion rate from the natural gas into the acetylene is not so high. Therefore, the non-thermal treating method has been introduced.

A representative example of the non-thermal treating method is a method using non-equilibrium plasma (low-temperature plasma). When methane gas is introduced into the low-temperature plasma, the molecules of the methane collide with electrons having a high energy of the low-temperature plasma, and thereby hydrogen atom is separated from the methane molecules to yield radicals such as methyl ($CH3$) and methylene ($CH2$).

The radicals may become ethane ($C2H6$) by recombining reaction. When energy is continuously applied, the methyl radical ($CH3$) may become methylene ($CH2$) or methylidyne (CH) radical by successive dehydrogenation. The CHx radicals obtained as described above make up C2 hydrocarbon such as ethane, ethylene, and acetylene through a recombination process.

FIG. 1 shows a conventional gas conversion apparatus 11 using the gliding plasma, a kind of non-thermal treating method.

Referring to FIG. 1, the conventional gas conversion apparatus 11 includes a reaction chamber 13 providing a closed inner space and having a discharge hole 17 on a lower portion, anode and cathode plates 23 and 25 fixedly installed in the reaction chamber 13, and a power source 19 supplying positive and negative currents to the anode and cathode plates 23 and 25 through power lines 21.

The reaction chamber 13 includes a nozzle 15 in a top plate 13. The nozzle 15 injects gas (hereinafter, referred to as material gas) into the reaction chamber 13 between the anode plate 23 and the cathode plate 25 for converting the material gas.

The anode plate23 and the cathode plate 25 have a blade shape with a constant thickness and vertically fixed by separate supports (not shown). Specifically, the anode plate 23 and the cathode plate 25 face each other, and the facing surfaces of the anode plate 23 and the cathode plate 25 are curved so as to depart from each other further more as they go downward.

When an electricity is applied to the fixed anode and cathode plates 23 and 25, plasma is induced between the fixed anode and cathode plates 23 and 25. The plasma is a gliding plasma (or non-thermal plasma or low-temperature plasma) that glides downward when a downward force is applied by flow of material gas (G). The plasma is placed between the facing surfaces of the anode and cathode plates 23 and 25.

However, the gas conversion rate of the conventional gas conversion apparatus 11 is not good since the plasma region (A) is not sufficient. That is, since the region (A) occupied by the induced plasma is very small when compared with the total space inside the reaction chamber 13, a large portion of the material gas (G) injected into the reaction chamber 13 is not contacted with the plasma before the material gas (G) is discharged through the discharge hole 17, thereby decreasing the gas conversion performance of the gas conversion apparatus 11.

Further, since the plasma region (A) is narrow as described above, the material gas (G) injected from the nozzle 15 passes through the plasma region (A) in a very short time. To solve these problems, that is, to increase the time in which the material gas (G) passes through the plasma region (A), the injection amount of the material gas (G) or the injection speed of the material gas (G) is controlled. However, the gas conversion rate of the gas conversion apparatus is hardly increased by this control.

Referring to a thesis published about the gas conversion apparatus 11, a maximal gas conversion rate of 40% is obtained by maximizing the plasma region (A) and optimally controlling the gas injection amount and the gas injection speed. In this case, 60% of the material gas (G) is discharged to the outside through the discharge hole 17 without reaction with the plasma.

Furthermore, it is very difficult to control the gas conversion rate of the gas conversion apparatus 11. Practically, the gas conversion rate should be increased or decreased according to the kind of desired final object (converted gas). However, since the gas conversion rate of the gas conversion apparatus 11 is controlled by adjusting the injection amount or injection speed of the material gas, the sensitivity of the controlling is not good and the span of control is narrow, thereby precise controlling cannot be attained.

SUMMARY OF THE INVENTION

The present invention provides an apparatus for converting gas using gliding plasma. In the apparatus, gliding plasma is induced between an inner wall of a reaction chamber and an electrode member disposed at a center inside the reaction chamber, and the induced gliding plasma is forced to swirl down in the circumferential direction of the electrode member to form a plasma region between the electrode member and the inner wall of the reaction chamber, so that the plasma region can be widely formed in the reaction chamber to increase gas conversion rate. Particularly, since the gliding speed of the gliding plasma can be controlled, the contact time of the material gas and the gliding plasma can be adjusted to control the gas conversion rate and selectivity for the post-reaction materials.

According to an aspect of the present invention, there is provided an apparatus for converting gas using gliding plasma, the apparatus including: a reaction chamber including a cylindrical inner space and a discharge hole in a lower portion; an electrode member installed on the reaction chamber and extended downward in a downwardly tapered shape, the electrode member including a lower end disposed at the inner space of the reaction chamber and insulated from the reaction chamber; a power source applying electricity to the reaction chamber and the electrode member for inducing plasma between an inner wall of the reaction chamber and the electrode member; a magnetic field generating unit installed outside the reaction chamber to rotate the plasma induced inside the reaction chamber in a circumferential direction of the electrode member for forming a plasma region; and a gas supplying unit supplying material gas into the reaction chamber to allow the material gas to pass through the plasma region for converting the material gas into a different gas by energy supplied from the plasma.

The reaction chamber may include an openable top portion, and the electrode member is detachably installed on the reaction chamber.

The apparatus may further include an insulating electrode holder fixed to the electrode member and supported by the reaction chamber, the electrode holder including a connection rod therein, the connection rod being fixed to the electrode member in electrical connection with the electrode member and longitudinally extended for electrical connection with the power source.

The gas supplying unit may include at least one nozzle injecting the material gas between the inner wall of the reaction chamber and the electrode member, the nozzle being positioned such that the material gas injected from the nozzle moves downward while swirling around the electrode member.

The apparatus may further include a heat exchanger inside the reaction chamber for cooling the material gas after the material gas passes through the plasma region in a downward direction.

The magnetic field generating unit may include: a coil enclosing the reaction chamber; a power source supplying power to the coil; and a controller connected to the power source for controlling the power to the coil.

The electrode member may have a conical shape.

The electrode member may have a convexly curved outer surface or a concavely curved outer surface.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 2:
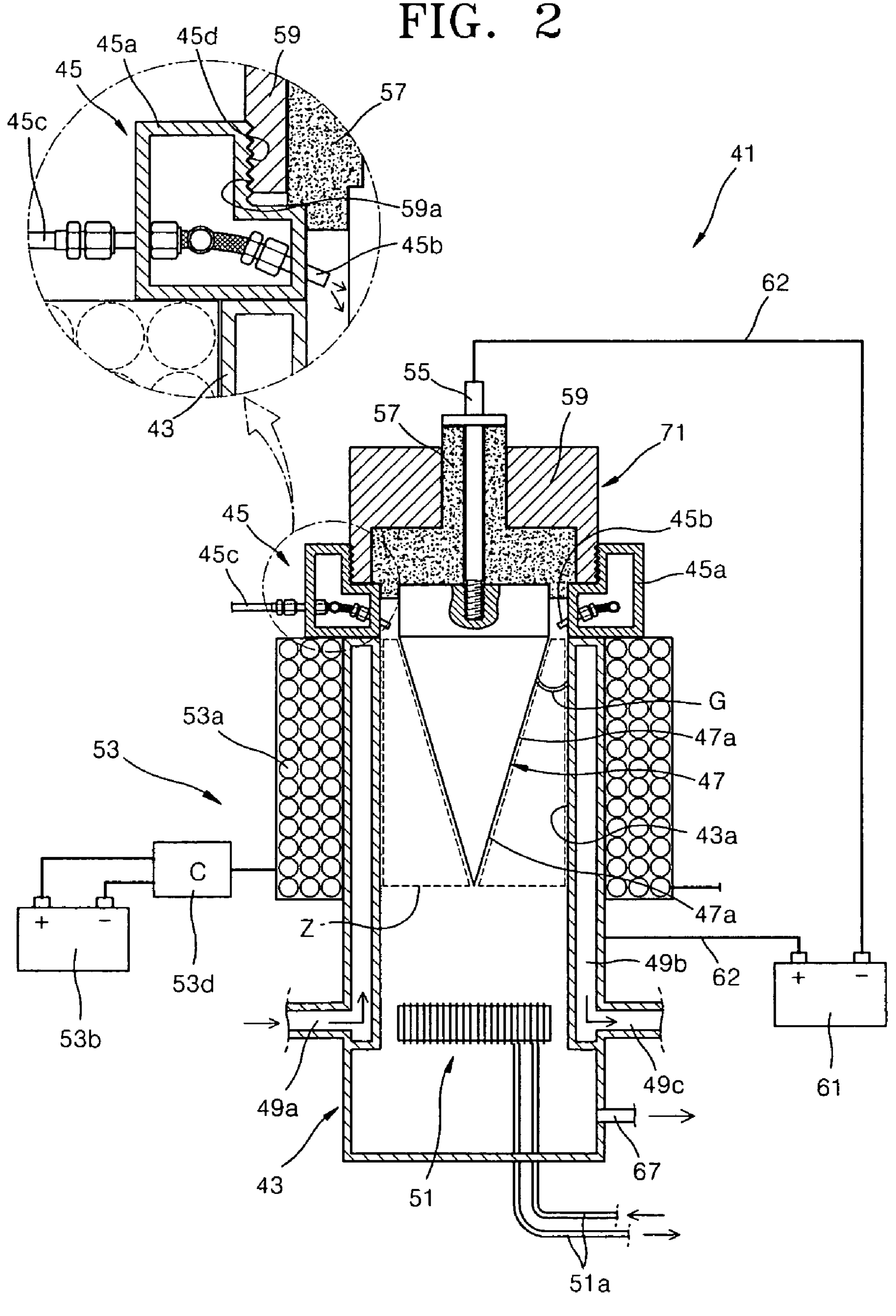
FIG. 2 shows an overall structure of an apparatus for converting gas using gliding plasma according to an embodiment of the present invention.

FIG. 2 shows an overall structure of an apparatus 41 for converting gas using gliding plasma according to an embodiment of the present invention.

Referring to FIG. 2, the gas conversion apparatus 41 includes: a reaction chamber 43 providing a cylindrical inner space having a predetermined diameter; a gas supplying unit 45 installed on a top of the reaction chamber 43 for supplying material gas into the reaction chamber 43; an electrode unit 71 detachably supported on the reaction chamber 43 through the gas supplying unit 45; and a magnetic field generating unit 53 enclosing the reaction chamber 43 for generating a magnetic field inside the reaction chamber 43 in a predetermined direction.

The reaction chamber 43 has a cylindrical shape with an open top. The reaction chamber 43 includes a coolant circulation passage 49*b* in a lateral wall. The coolant circulation passage 49*b* is a coolant jacket cooling the reaction chamber 43 when plasma is generated inside the reaction chamber 43. For this, the coolant circulation passage 49*b* includes a coolant inlet 49*a* on one end and a coolant outlet 49*c* on the other end. Coolant is introduced through the coolant inlet 49*a* to cool the reaction chamber 43 while passing through the coolant circulation passage 49*b*. After cooling the reaction chamber 43, the coolant is discharged to the outside through the coolant outlet 49*c*.

The reaction chamber 43 includes an inner wall 43*a* having a predetermined inside diameter for defining the inner space of the reaction chamber 43. Inside the inner space, an electrode member 47 (described later) is vertically positioned, and a plasma region (z) is formed between the inner wall 43*a* and the electrode member 47.

The reaction chamber 43 includes a discharge hole 67 in a lower portion. The material gas supplied into the reaction chamber 43 through the gas supplying unit 45 passes through the plasma region (z), and then discharged to the outside through the discharge hole 67.

The gas supplying unit 45 receives material gas from an outside gas source and injects the material gas into the reaction chamber 43 downwardly in a tangential direction of the electrode member 71, such that the injected material gas moves down while swirling around the electrode member 71. Gliding plasma (G) (described later) generated between the electrode member 71 and the inner wall 43*a* is pushed down while being swirled around the electrode member 71 by the flow of the material gas.

The gas supplying unit 45 coupled to the top end of the reaction chamber 43 includes a casing 45*a* having an inner space, a plurality of nozzles 45*b* fixed in the casing 45*a* for injecting the material gas into the reaction chamber 43 toward the plasma region (z), and a gas supplying pipe 45*c* and a ring-shaped pipe 45*e* (refer to FIG. 3) that supply the material gas from an outside to the nozzles 45*b*.

Figure 3:
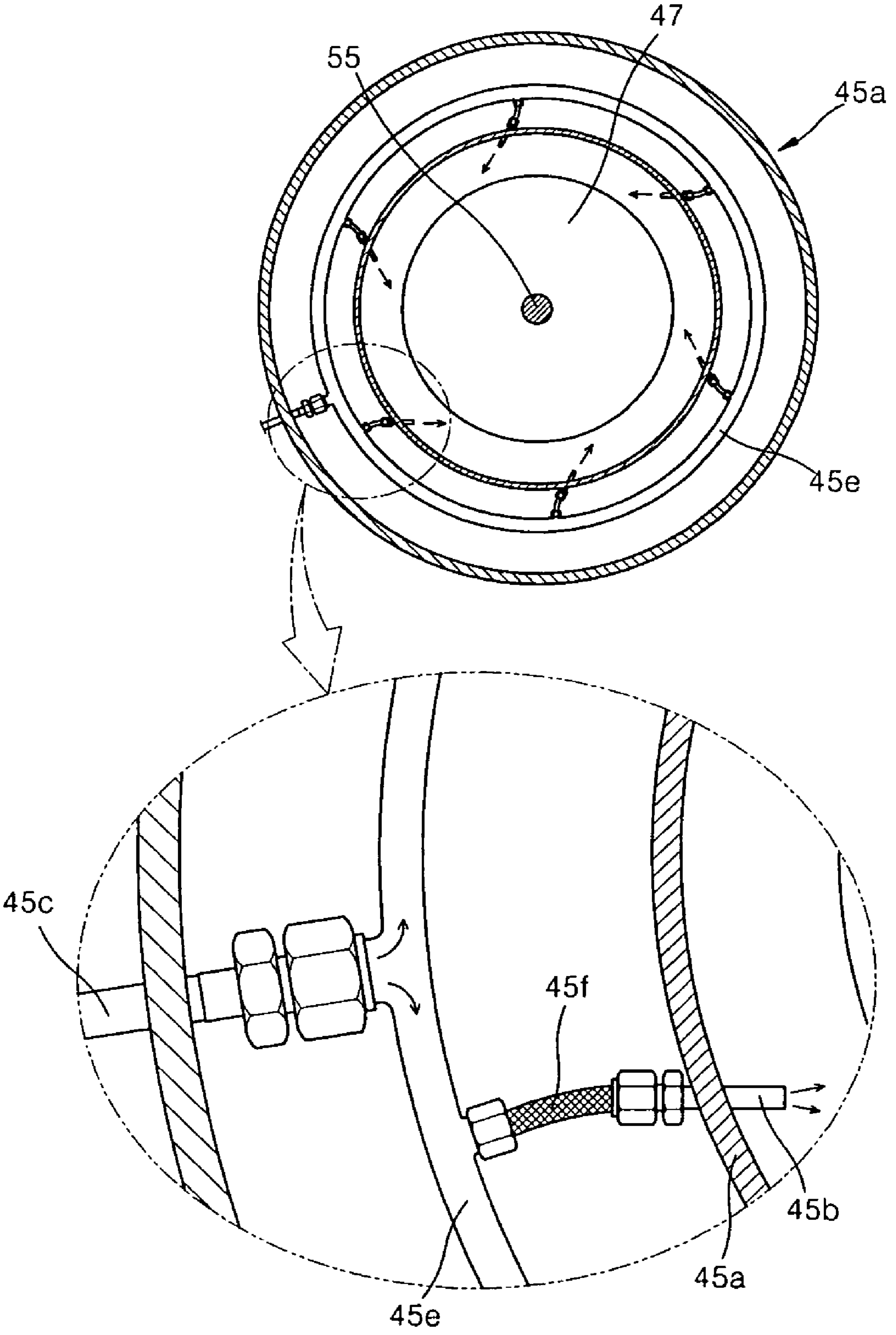
FIG. 3 is a cross-sectional view showing a detail structure and operation of a gas supplying unit depicted in FIG. 2.

FIG. 3 is a cross-sectional view showing a detail structure and operation of the gas supplying unit 45.

Referring to FIG. 3, the ring-shape pipe 45*e* is positioned at the inner space inside the casing 45*a*. The ring-shaped pipe 45*e* is curved in a ring shape and connected with the nozzles 45*b* through connecting tubes 45*f*. The gas supplying pipe 45*c* is also connected with the ring-shaped pipe 45*e* to supply the material gas to the nozzles 45*b*. Therefore, the material gas is introduced into the ring-shaped pipe 45*e* through the gas supplying pipe 45*c* and supplied to each of the nozzles 45*b* while being flowed inside the ring-shaped pipe 45*e*, so that the material gas can be injected through the nozzles in a designed direction.

In the embodiment shown in FIGS. 2 and 3, the ring-shape pipe 45*e* or the plurality of nozzles 45*b* are used to inject the material gas into the plasma region (z). However, this structure can be modified or changed so long as the material gas can be injected in a desired direction.

Referring again to FIG. 2, the casing 45*a* of the gas supplying unit 45 is formed with a female thread portion 45*d*. The female thread portion 45*d* is formed on an inner surface of the casing 45*a* for coupling with a male thread portion 59*a* of a cap 59 (described later) to close the reaction chamber 43.

The electrode unit 71 includes: the electrode member 47 having a conical shape and disposed at a center of the inner space defined by the inner wall 43*a* of the reaction chamber 43; an electrode holder 57 coupled to a top of the electrode member 47 and placed on the casing 45*a*; a connection rod 55 having a lower end fixed to the electrode member 47, an upper end connected to a power line 62 of a power source 61, and extended portion between the lower and upper ends through the electrode holder 57, for supplying power from the power source 61 to the electrode member 47; and the cap 59 enclosing the electrode holder 57 and thread-coupled with the casing 45*a*. The connection rod 55 may be fixed to the electrode member 47 by thread-coupling.

The electrode member 47 has a reversed conical shape. Particularly, the electrode member 47 is coaxial with the inner space formed by the inner wall 43*a* of the reaction chamber 43. Further, since the electrode member 47 is symmetric with respect to its center line, an outer sloped surface 47*a* of the electrode member 47 departs from the inner wall 43*a* much more as it goes downward. The minimal distance between the sloped surface 47*a* and the inner wall 43*a* is selected such that plasma can be generated when an electricity is applied between the sloped surface 47*a* and the inner wall 43*a*. The maximal distance between the sloped surface 47*a* and the inner wall 43*a* is defined between a lower end of the electrode member 47 and the inner wall 43*a*. That is, the maximal distance is equal to the inner radius of the inner wall 43*a*.

The electrode holder 57 is formed of an electrically insulating material, and the electrode member 47 is fixed to a lower portion of the electrode holder 57. The electrode holder 57 may be formed of various insulating materials including synthetic resin and soft rubber. Particularly, a lower edge of the electrode holder 57 is tightly held by the casing 45*a* to hermetically close the reaction chamber 43 located below.

The cap 59 covers the electrode holder 57 and includes the male thread portion 59*a* on a lower outside end surface. The male thread portion 59*a* couples with the female thread portion 45*d* of the casing 45*a*. The male thread portion 59*a* and the female thread portion 45*d* can be selectively engaged with and disengaged from each other. Therefore, the electrode unit 71 can be detached from the reaction chamber 43. That is, elements of the electrode unit 71 such as the electrode member 47 can be replaced with new one by unscrewing the electrode unit 71 away from the reaction chamber 43.

In the embodiment shown in FIG. 2, the electrode unit 71 is thread-coupled to the casing 45*a*. However, the coupling can be modified and changed.

A heat exchanger 51 is provided under the electrode member 47. The heat exchanger 51 is a water-cooled type heat exchanger for cooling gas pushed down from the plasma region (z). The heat exchanger 51 is connected with a cooling water pipe 51*a*, and cooling water circulates inside the heat exchanger 51 when the heat exchanger 51 operates.

The magnetic field generating unit 53 includes a coil 53*a* enclosing the outer surface of the reaction chamber 43, a power source 53*b* applying an electricity to the coil 53*a*, and a controller 53*d* connected to the power source 53*b* for controlling the current to the coil 53*a*.

The magnetic field generating unit 53 induces a magnetic field inside the plasma region (z), so that the gliding plasma (G) formed in the plasma region (z) can be rotated by Lorentz force. As is well-known, plasma is attracted by a magnetic force. Therefore, the gliding plasma (G) can be moved in the direction of magnetic flux by forming a magnetic field in the plasma region (z).

The moving speed of the gliding plasma (G) increases in proportion to the strength of the magnetic field. Further, since the current applied to the coil 53*a* is controlled by the controller 53*d*, the moving speed of the gliding plasma (G) can be controlled by the controller 53*d*.

Therefore, the plasma region (z) is divided up and down by the gliding plasma (G) which is formed like disk shape when the speed of the gliding plasma (G) moving around the electrode member 47 is increased by the controller 53*d*.

For reference, when the gliding plasma (G) is placed in a flow of gas, the gliding plasma (G) is moved by a pressure applied by the gas flow as well as the magnetic force. Therefore, for example, when the material gas is injected into the reaction chamber 43 through the nozzles 45*b* while the magnetic field generating unit 53 does not operate, the gliding plasma (G) is moved in the gas injection direction (i.e., the gliding plasma (G) is moved down while being swirled around the electrode member 47).

When the gas supplying unit 45 and the magnetic field generating unit 53 operated at the same time, the gliding plasma (G) swirls around the electrode member 47 by the pressure (horizontal direction) of the gas flow and Lentz force, and at the same time the gliding plasma (G) gradually moves down by the vertical pressure of the gas flow. The gliding plasma (G) as it moves down meets the lower end of the electrode member 47 and disappears after the lower end. The gliding plasma (G) appears again at the top end of the electrode member 47.

Eventually, by injecting the material gas downward and applying the magnetic field inside the reaction chamber, the gliding plasma (G) can be moved from a top to a bottom of the plasma region (z) to apply energy to the material gas, so that the material gas (pre-reaction gas) can be converted into desired gas (post-reaction gas).

The amount of energy applied to the material gas by the gliding plasma (G) is proportional to the mean density of the gliding plasma (G) filled in the plasma region (z). The mean density varies according to the swirling speed and the downwardly-moving speed of the gliding plasma (G). As the swirling speed of the gliding plasma (G) around the electrode member 47 increases and the downwardly-moving speed of the gliding plasma (G) along the electrode member 47 increases, the mean density of the gliding plasma (G) per unit time increases inside the plasma region (z).

Therefore, the amount of energy applied to the material gas can be controlled by adjusting the swirling speed and/or the downwardly-moving speed of the gliding plasma (G).

Figure 4:
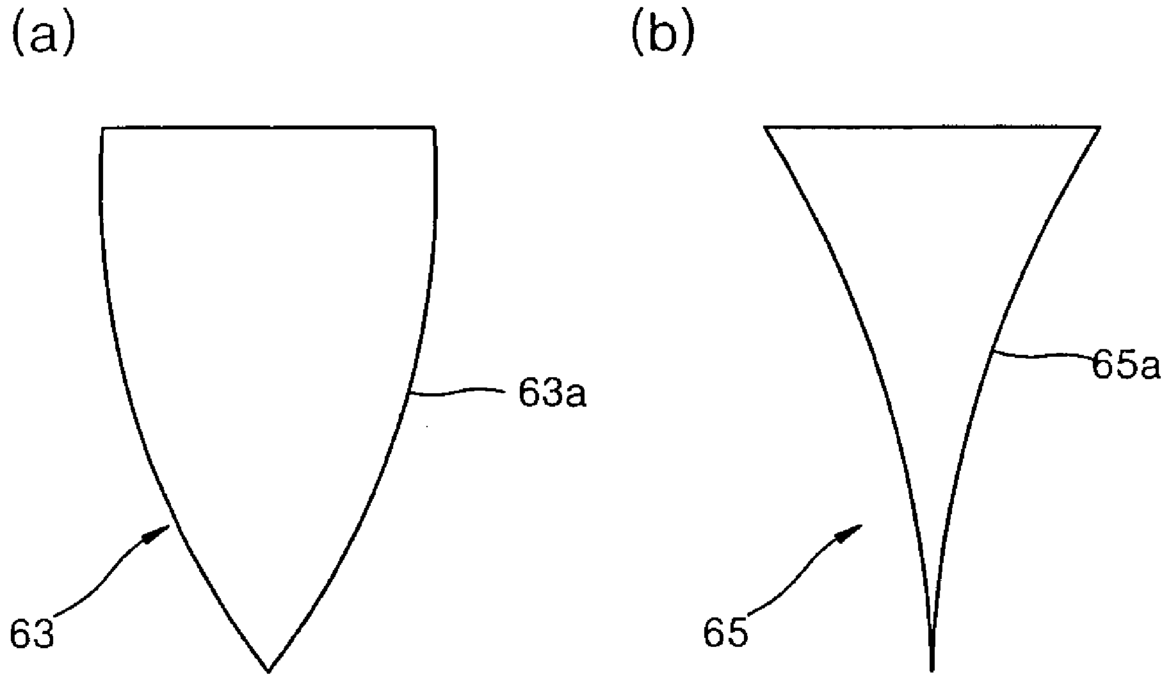
FIGS. 4A and 4B are front views showing differently-shaped electrode members that can be applied to the apparatus depicted in FIG. 2.

FIGS. 4A and 4B are front views showing differently-shaped electrode members that can be applied to the gas conversion apparatus 41 depicted in FIG. 2.

Although the sloped surface 47*a* of the electrode member 47 shown in FIG. 2 is straight, an electrode member 63 shown in FIG. 4A has a convexly sloped surface 63*a*, and an electrode member 65 shown in FIG. 4B has a concavely sloped surface 65*a*.

In the gas conversion apparatus 41 according to the embodiment of the present invention, the shape of the electrode member can be modified or changed so long as the cross section of the electrode member decreases downwardly.

A method of converting gas using the gas conversion apparatus 41 will now be described.

When power is supplied from the power source 61, gliding plasma (G) is induced in the plasma region (z). The power source 61 supplies a positive current to the reaction chamber 43 and a negative current to the electrode member 47, such that the gliding plasma (G) is induced between the top end of the sloped surface 47*a* of the electrode member 47 and the inner wall 43*a* facing the top end.

After the gliding plasma (G) is induced, a magnetic field is formed in the plasma region (z) by manipulating the controller 53*d*. The magnetic field formed in the plasma region (z) applies a magnetic force (Lorenz force) to the gliding plasma (G) to rotate the gliding plasma (G) around the electrode member 47. The rotating speed of the gliding plasma (G) is controlled by the controller 53*d*, generally at about several hundred revolutions per second.

When the gliding plasma (G) is rotated at a speed enough for supplying sufficient energy, material gas to be reacted with the gliding plasma (G) is injected downward through the nozzles 45*b* of the gas supplying unit 45. The material gas injected downward by the nozzles 45*b* is directed in the tangential direction of the electrode member 47, such that the material gas swirls around the electrode member 47 and moves down, for example, along a three-dimensional spiral path. While the material gas swirls down, the gliding plasma (G) is moved down by a pressure applied by flow of the material gas.

Particularly, since the material gas moves downward more fast than the gliding plasma (G), the injected material gas receives energy from the gliding plasma (G) while passing through the thickness of the downwardly-moving gliding plasma (G). The material gas is converted by the energy received from the gliding plasma (G) and then discharged through the discharge hole 67.

Experiments are performed using the gas conversion apparatus according to the embodiment of the present invention to convert methane into acetylene.

Experiment 1

Methane (material gas) is diluted with nitrogen gas to a concentration of 20%, and a total flow rate of the material gas is set to 10 liters/minute. The power from the power source is set to 600 watts, the magnetic flux density for rotating the gliding plasma is set to 833 Gausses, and a Gas Chromatography (GC, HP 5890 series) is used as an analyzing device for analyzing post-reaction gas. The entire reaction is performed at a room temperature and an atmospheric pressure. The result of the experiment 1 is shown in Table below.

Experiment 2

All experimental conditions are the same as the experiment 1 except that the magnetic flux density is set to 1100 gausses.

Comparison Experiment Example

Figure 1:
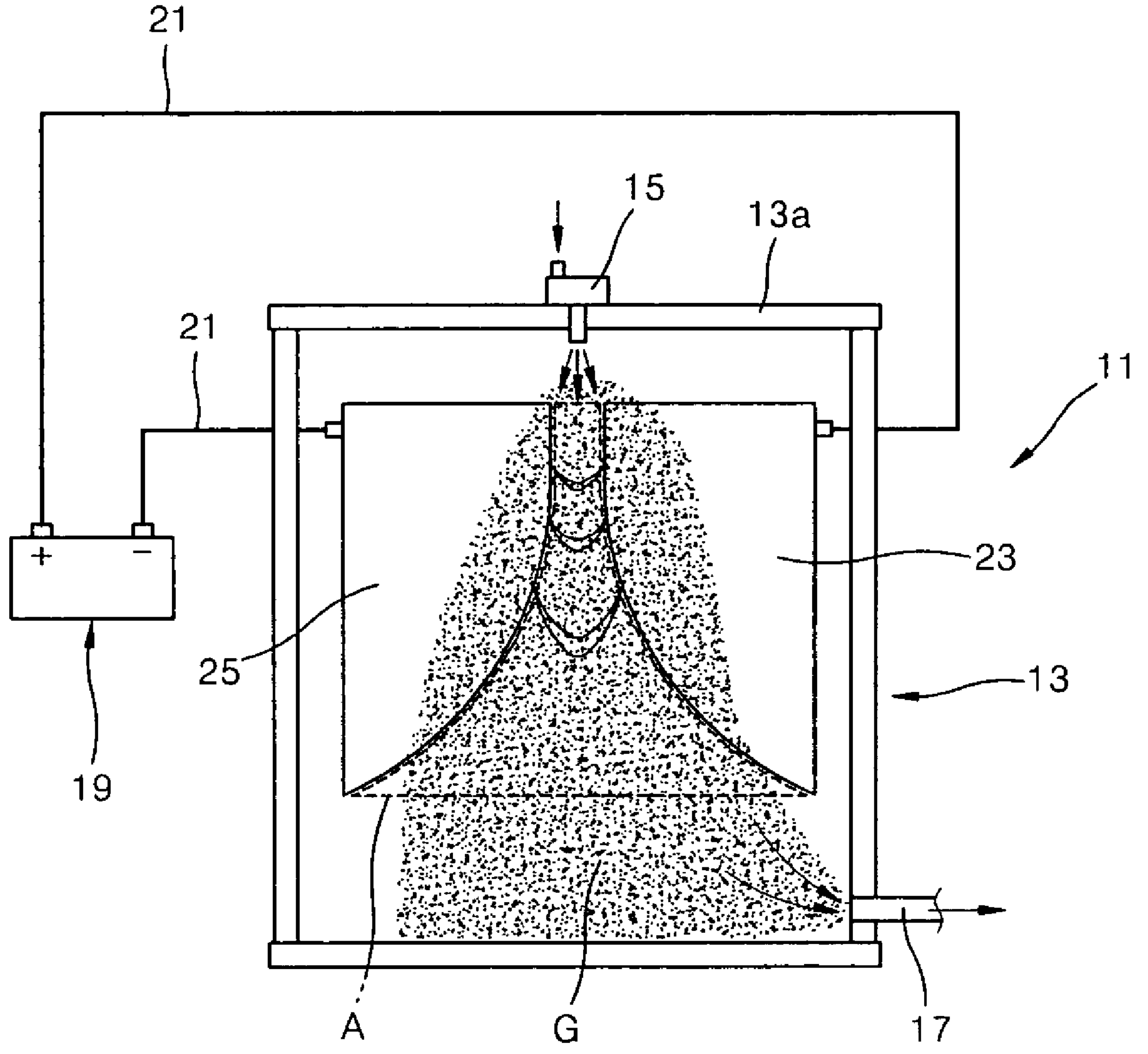
FIG. 1 (PRIOR ART)
FIG. 1 shows a structure of a conventional gas conversion apparatus.

This comparison experiment is performed using the gas conversion apparatus 11 of FIG. 1 under the same conditions as the experiment 1.

TABLE

| | Gausses (A) | Methane concentration (%) | Conversion rate (%) | Selectivity (%) | Yield (%) |
|---|---|---|---|---|---|
| Experiment 1 | 833 | 20 | 75.3 | 45.7 | 35.3 |
| Experiment 2 | 1100 | 20 | 80 | 49.1 | 39.3 |
| Comparison experiment | — | 20 | 27.8 | 45.8 | 12.7 |

Referring to Table above, according to the gas conversion apparatus of this embodiment, the conversion rate (moles of methane gas after reaction/moles of injected methane gas) is higher than 75%, and the yield (2*moles of acetylene gas/moles of injected methane gas) is higher than 35%. The experimental results show that the conversion rate and the yield are much higher in the present invention than in the related art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for converting gas using gliding plasma, comprising:

a reaction chamber including a cylindrical inner space and a discharge hole in a lower portion;

an electrode member installed on the reaction chamber and extended downward in a downwardly tapered shape, the electrode member including a lower end disposed at the inner space of the reaction chamber and insulated from the reaction chamber;

a power source configured to apply electricity to the reaction chamber and the electrode member for inducing plasma between an inner wall of the reaction chamber and the electrode member;

a magnetic field generating unit installed outside the reaction chamber to rotate the plasma induced inside the reaction chamber in a circumferential direction of the electrode member for forming a plasma region; and a gas supplying unit configured to supply material gas into the reaction chamber to allow the material gas to pass through the plasma region for converting the material gas into a different gas by energy supplied from the plasma.

2. The apparatus of claim 1, wherein the reaction chamber comprises an openable top portion, and the electrode member is detachably installed on the reaction chamber.

3. The apparatus of claim 2, further comprising an insulating electrode holder fixed to the electrode member and supported by the reaction chamber, the electrode holder including a connection member therein, the connection member being fixed to the electrode member in electrical connection and longitudinally extended for electrical connection with the power source.

4. The apparatus of claim 1, wherein the gas supplying unit comprises at least one nozzle injecting the material gas between the inner wall of the reaction chamber and the electrode member, the nozzle being positioned such that the material gas injected from the nozzle moves downward while swirling around the electrode member.

5. The apparatus of claim 1, further comprising a heat exchanger inside the reaction chamber for cooling the gas passing through the plasma region in a downward direction.

6. The apparatus of claim 1, wherein the magnetic field generating unit comprises:

a coil enclosing the reaction chamber;

a power source supplying power to the coil; and a controller connected to the power source for controlling the power to the coil.

7. The apparatus of claim 1, wherein the electrode member has a conical shape.

8. The apparatus of claim 7, wherein the electrode member has a convexly curved outer surface or a concavely curved outer surface.

* * * * *